(12) United States Patent
Carrick et al.

(10) Patent No.: US 7,376,350 B2
(45) Date of Patent: May 20, 2008

(54) METHODS AND APPARATUS FOR OPTICAL NETWORK MANAGEMENT USING PILOT TONES

(75) Inventors: John C. Carrick, Wakefield, MA (US); Mark I. Oppenheimer, Carmel, NY (US); Rajiv R. Ramaswami, Yorktown Heights, NY (US); Ornan A. Gerstel, New York, NY (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 11/532,903

(22) Filed: Sep. 18, 2006

(65) Prior Publication Data

US 2007/0104483 A1 May 10, 2007

Related U.S. Application Data

(62) Division of application No. 11/328,769, filed on Jan. 10, 2006, now Pat. No. 7,123,832, which is a division of application No. 09/460,214, filed on Dec. 13, 1999, now Pat. No. 7,016,607.

(60) Provisional application No. 60/112,413, filed on Dec. 14, 1998.

(51) Int. Cl.
*H04J 14/00* (2006.01)
(52) U.S. Cl. ............... 398/57; 398/58; 398/32
(58) Field of Classification Search ......... 398/32, 398/58, 57
See application file for complete search history.

(56) References Cited

U.S. PATENT DOCUMENTS

| 5,161,044 A | 11/1992 | Nazarathy et al. |
|---|---|---|
| 5,212,807 A | 5/1993 | Chan |
| 5,321,543 A | 6/1994 | Huber |
| 5,343,324 A | 8/1994 | Le et al. |
| 5,532,867 A | 7/1996 | Hayes et al. |
| 5,835,720 A | 11/1998 | Nelson et al. |
| 6,047,331 A | 4/2000 | Medard et al. |
| 6,108,113 A | 8/2000 | Fee |
| 6,205,122 B1 | 3/2001 | Sharon et al. |
| 6,252,857 B1 | 6/2001 | Fendick et al. |
| 6,545,984 B1 * | 4/2003 | Simmons ............... 370/254 |
| 6,574,016 B1 | 6/2003 | Harley et al. |

OTHER PUBLICATIONS

Hill, et al., "A Transport Network Layer Based on Optical Network Elements", *Journal of Lightwave Technology*, IEEE/OSA, vol. 11, No. 5/6, May/Jun. 1993, pp. 667-679.

Y. Hamazumi, et al., "Transmission Capacity of Optical Path Overhead Transfer Scheme Using Pilot Tone for Optical Path Network", *Journal of Lightwave Technology*, IEEE/OSA, vol. 15, No. 12, Dec. 1997, pp. 2197-2205.

* cited by examiner

*Primary Examiner*—Agustin Bello
(74) *Attorney, Agent, or Firm*—Davis & Associates; William D. Davis

(57) ABSTRACT

Methods and apparatus for managing an optical network using pilot tones are provided. One method includes selecting an optical path having a plurality of nodes from a database defining an expected optical network. A detected list of pilot tones associated with each node of the selected optical path is generated. An expected list of pilot tones associated with each node of the selected optical path is generated. The detected and expected lists are compared to identify any mismatched nodes.

19 Claims, 10 Drawing Sheets

METHODS AND APPARATUS FOR OPTICAL NETWORK MANAGEMENT USING PILOT TONES

CROSS-REFERENCE TO RELATED APPLICATIONS

This application is a divisional of application Ser. No. 11/328,769, filed Jan. 10, 2006 now U.S. Pat. No. 7,123,823 which is a divisional of application Ser. No. 09/460,214, filed Dec. 13, 1999 (now U.S. Pat. No. 7,016,607), which claims the benefit of U.S. Provisional Application No. 60/112,413, filed Dec. 14, 1998 entitled "Apparatus and Methods for Optical Network Management Using Pilot Tones," of Carrick, et al.

FIELD OF THE INVENTION

This invention relates to the field of optical communications networks. In particular, this invention is drawn to validating optical communication network configurations through the use of pilot tones.

BACKGROUND OF THE INVENTION

Optical communications networks are used to transport large amounts of voice and data through fiber optic cables. Wave-division multiplexing (WDM) can be used to transmit multiple channels of optical information through the same fiber optic cable. Multiple channels are carried in the same fiber by assigning different optical wavelengths to each channel.

The optical signals degrade over distance such that re-generation or re-amplification may be required. Moreover, the channels within a fiber tend to degrade at different rates. The total mean output power is frequently used as an indicator of signal degradation. Optically amplifying the signals to maintain the total mean output power at a constant is not particularly effective due to the differences in degradation between channels. Moreover, increasing the amplification gain to maintain a constant mean output power without regard to individual channels can create significant distortions on an individual channel basis. Increasing gain to compensate for the loss of a few channels may result in too much amplification for the remaining channels individually even though the total mean power output remains constant. Accordingly, optical power is determined and regulated on a channel-by-channel basis.

In order to measure optical power on a channel-by-channel basis, an identifying pilot tone is superimposed upon each channel. Within a given fiber the pilot tones should be unique in order to distinguish all channels for the purpose of power calculations. Given that the pilot tone and the channel signal originate from the same source, the optical channel power can be inferred from the pilot tone power and its fixed modulation depth at the source. The optical channel power can then be used to adequately control the optical amplifiers in the network.

This technique helps to regulate the quality of optical signals along a known optical path, but the technique does not work if there are network configuration errors such as an identification of multiple sources for the same optical signal or a complete loss of a selected channel. Generally, differences between the planned network configuration and the actual network configuration can significantly impair the process of managing the network.

SUMMARY

In view of limitations of known systems and methods, various methods and apparatus to enable mapping and validation of static and dynamic optical networks are described. In particular, methods and apparatus for managing a static optical network to enable mapping an actual optical network configuration or validating an expected optical network configuration are provided. In addition, methods and apparatus to enable mapping and validation of optical networks when adding nodes, optical paths, or even another network are provided.

One embodiment of a method of managing an optical network includes the step of selecting an optical path having a plurality of nodes from a database defining an expected optical network. A list of detected pilot tones from each node associated with the selected optical path is generated. An expected list of pilot tones associated with each node of the selected optical path is generated. The expected list and detected list are then compared to identify any mismatched nodes.

A method of mapping an optical network includes the step of setting a first pilot tone source to have a first pilot tone value. All other network pilot tone sources are set to have a second pilot tone value. An optical path associated with the first pilot tone source is then mapped by identifying each node of the network having the first pilot tone value.

An alternative method of mapping an optical network includes the step of selecting a plurality of pilot tone sources, each associated with an optical path. The plurality of pilot tone sources are assigned pilot tone values such that no two pilot tones sharing a same optical path segment or node have a same pilot tone value. The pilot tone values are assigned such that no node adjacent to a selected optical path shares the same pilot tone as the pilot tone source associated with the selected optical path. The optical path associated with each pilot tone source can then be identified by detecting pilot tone values at each node of the plurality of optical paths.

The inference of the actual optical path when mapping or validating can be improved through the additional step of applying extraneous information. In one embodiment all nodes carrying a same pilot tone as a selected pilot tone source of the network are identified. Possible node order permutations are generated to identify possible actual optical paths for the selected pilot tone source. Extraneous information such as node type, geographic construction rules, or other information is then used to reduce the number of permutations to identify the likely actual optical path.

A method of adding a selected node to an optical network includes the step of generating a list of pilot tones to be contributed by the selected node to each of its target nodes of the optical network. Network pilot tone sources are re-configured so that a pilot tone source of any optical path incorporating one of the target nodes has a value distinct from the listed pilot tones. The selected node may then be added to the optical network.

A method of adding an optical path to an optical network includes the step of generating a list of all network nodes to be incorporated into a new optical path and nodes adjacent to the selected network nodes. Network pilot tone sources are then re-configured until a pilot tone source associated with the new optical path has a pilot tone distinct from that of any listed node. The optical path may then be added to the optical network.

A method of joining a plurality of optical networks includes the step of generating a first list of pilot tones carried by nodes of a second optical network being added by branches to target nodes of a first optical network. A second list of selected nodes including the target nodes and any nodes adjacent to the target nodes of the first optical network is generated. Pilot tone sources of the first network are re-configured until all selected pilot tone sources having an optical path sharing one of the selected nodes have relatively unique pilot tones distinct from the first list. The first and second network may then be merged.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
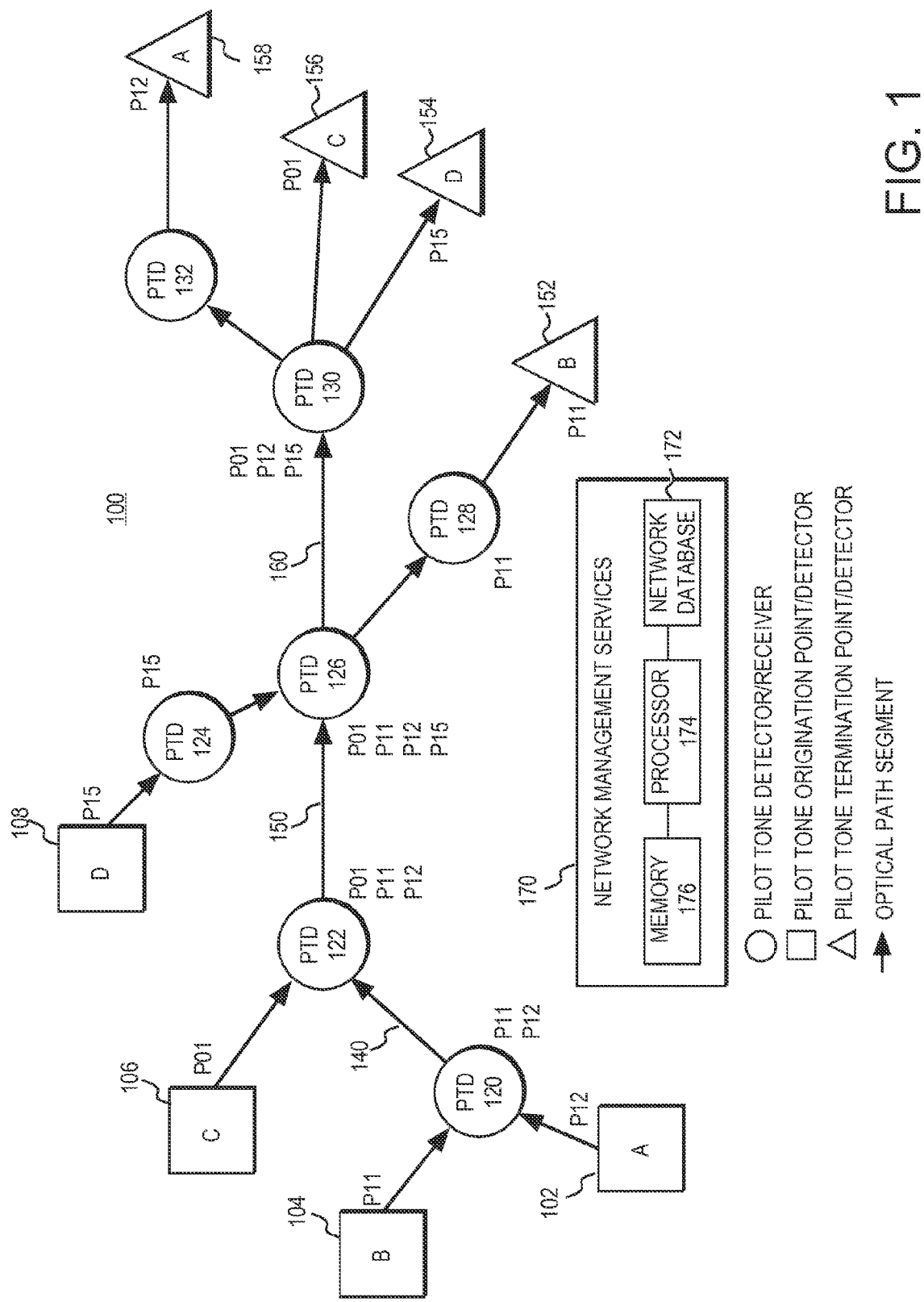
FIG. 1 illustrates one embodiment of an optical network.

FIG. 1 illustrates one embodiment of an optical network 100. The network includes a plurality of nodes identified as pilot tone origination points 102-108. Each pilot tone origination point is connected to the optical network through an optical path segment such as 140. The direction of the optical signal transmission is also illustrated.

Before terminating in a pilot tone termination points such as 152-158, the optical signals typically pass through a number of nodes. Throughout the network, pilot tone detection nodes such as 120 couple the optical signals to optical paths incorporating other network pilot tone detection nodes (e.g., 122-132) and ultimately to pilot tone termination nodes 152-158. Pilot tone origination or source nodes (e.g., 106) are coupled to a pilot tone termination node (e.g., 156) through one or more detection nodes (122, 126, 130) and optical path segments. Together these components form a selectable optical path.

Each of the nodes 102-108, 120-132, and 152-154 is capable of scanning the optical signal to identify the presence of any pilot tones. The pilot tones associated with a particular node are indicated near the node as appropriate. Pilot tones associated with a pilot tone origination point indicate the pilot tones being transmitted. Pilot tones associated with a pilot tone detector or a pilot tone termination point indicate the pilot tones being received. PTD 126, for example, is receiving pilot tones identified as P01, P11, P12, and P15.

Network management services 170 maintain a database 172 identifying the physical configuration of the network such as optical channel source and destination nodes as well as the interconnection (e.g., 140, 150, 160) of the nodes. Processor 174 retrieves program code from memory 176 for execution. The processor is capable of querying or updating the database 172 in accordance with instructions stored in memory 176. This database is particularly useful when physically modifying the network such as to move, replace, add, or remove nodes. Connections between network management services 170 and the remainder of the optical network 100 are not shown so as not to obscure the example.

The use of pilot tones to identify individual channels within a fiber also enables identifying configuration errors in the database or connectivity errors in the network. In addition, detection of the optical paths provides a diagnostic tool for locating missing optical signals or resolving extra optical signals in the network 100.

Figure 2:
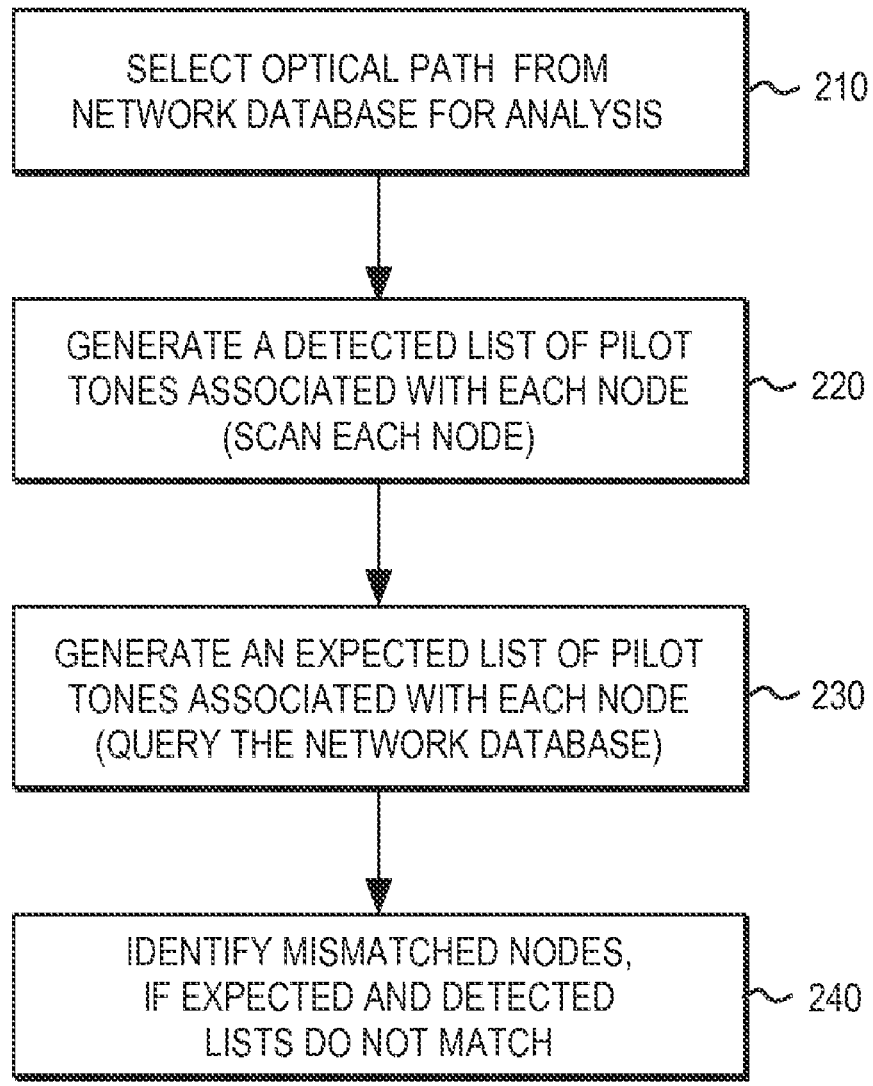
FIG. 2 illustrates a method of identifying configuration errors in an optical network.

FIG. 2 illustrates a method of identifying configuration errors in an optical network. First one or more optical paths as defined in the network database 172 are selected for analysis in step 210. An exemplary optical path might be the path formed by nodes 106, 122, 126, 130, and 156. Each node of the path is scanned to generate a list of its detected pilot tones in step 220. The network management database 172 is queried to generate a list of expected pilot tones for each node in step 230. The detected list is then compared with the expected list in step 240 to identify any mismatched nodes. Any mismatch indicates an error in the physical configuration of the network or in the database representation of the network. Discrepancies between the lists represent errors in the absence or presence of a pilot tone at a particular receiver. Once the discrepancies are identified at a particular node, pilot tones at adjacent nodes of the network can be examined to localize the source of the network error. "Adjacent nodes" in this context implies that some optical path is joining the two nodes without any intervening nodes regardless of whether the optical path is the same as the one under consideration.

Programmable pilot tones can be used to validate the network database routing for a particular optical path. Generally, all the nodes associated with a selected optical signal can immediately be identified by providing the selected optical signal with a pilot tone distinguishable from the pilot tone of any other optical signal sharing a node or any portion of the path used by the selected optical signal. The list of nodes carrying the distinguishing pilot tone can be used to empirically confirm the optical signal path with the expected list from the network database to locate errors for a specific optical path.

Figure 3:
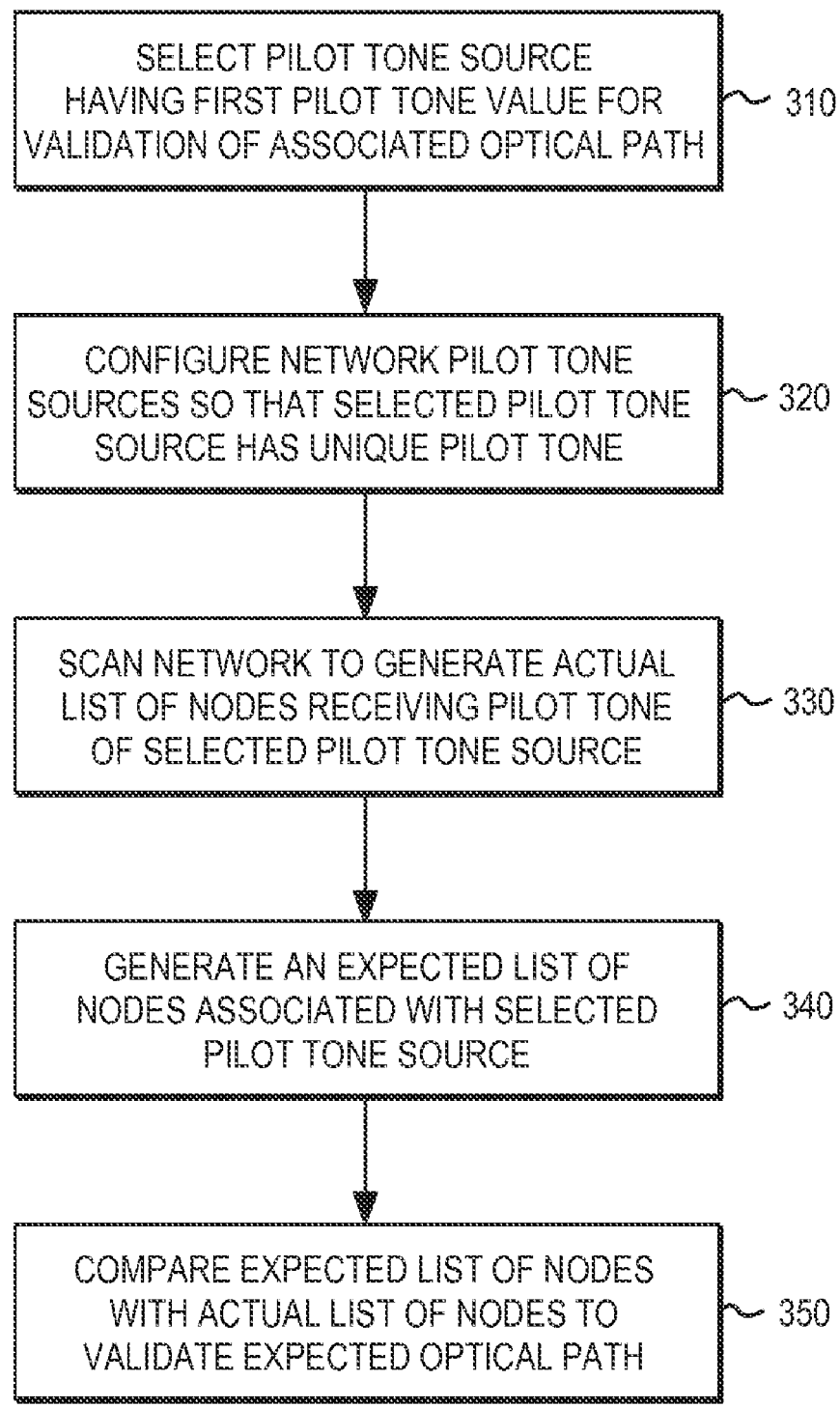
FIG. 3 sets forth one embodiment of a method for validating expected optical paths.

FIG. 3 sets forth one embodiment for validating optical paths. In step 310 a pilot tone source having a first pilot tone value is selected for mapping its associated optical path. In step 320, any other pilot tone sources are configured to ensure that the selected pilot tone source has a pilot tone distinguishable from all other pilot tones in the network. In one embodiment, the pilot tone sources have digitally encodable pilot tones to enable programmatic selection from a large number of pilot tones. In an alternative embodiment, the pilot tone sources are frequency programmable to provide distinguishable pilot tones.

In one embodiment, the selected pilot tone source is set to have a second pilot tone value distinguishable from all other pilot tones in the network, if the first pilot tone value is not distinguishable from that of all other pilot tone sources in the network. In an alternative embodiment step 320 is accomplished by setting the pilot tones of all other pilot tone sources to a value other than the first value. This could be accomplished, for example, by setting all the other pilot tone sources to a same value distinct from that of the first value. In an alternative embodiment, the other pilot tone sources may be set to any value different from that of the first value. The other pilot tone sources could all be assigned unique pilot tone values to achieve this step.

In step 330, each node of the network is then scanned to generate an actual list of all nodes receiving a pilot tone associated with the selected pilot tone source and it associated optical path. The actual list of nodes does not inherently identify the order of the nodes along the optical path with perhaps the exception of the source and the destination nodes. The actual list of identified nodes associated with the selected optical path can be used to empirically confirm the network database version of the optical path configuration or to locate network errors along the selected optical path by comparison with the expected list of nodes from the network database. Thus in step 340 an expected list of nodes along the optical path associated with the selected pilot tone source is generated. This can be accomplished by querying the network database 172. In step 350, the actual list of nodes is compared with the expected list of nodes from the network database to validate the optical path associated with the selected pilot tone source.

Mismatches tend to indicate network errors such as network configuration errors (i.e., optical path exists but not as intended), network problems (broken fibers, defective nodes), etc. Although the true optical path cannot be derived from the actual list of nodes without extraneous information, an exact match between the actual list and the expected list (without regard to order) serves to validate the expected list. Although not guaranteed, the actual order of the nodes along the optical path associated with the selected pilot tone source may be presumed to be the same as the expected order as indicated by the network database.

The method of FIG. 3 relies on the use of a pilot tone unique to the selected pilot tone source to determine the actual optical path associated with that pilot tone source. The validation of the optical paths of multiple pilot tone sources can proceed substantially simultaneously by ensuring that all pilot tone sources having their paths validated have pilot tones unique to each other and from all other pilot tone sources in the network.

In reality, determination of the nodes along the optical path associated with a selected pilot tone source does not require the use of a pilot tone unique to that of any other pilot tone source in the network if other information is used for validation. The actual optical path of a selected pilot tone source can still be validated when other pilot tone sources share the same pilot tone value under certain circumstances. As long as the actual and expected optical paths of a first and a second pilot tone source having a same pilot tone value do not share a same optical path segment or node, the actual list of nodes can still be used to validate the expected list in the network database. This permits validating network configurations without necessarily assigning a unique pilot tone value to all pilot tone sources being mapped.

Figure 4:
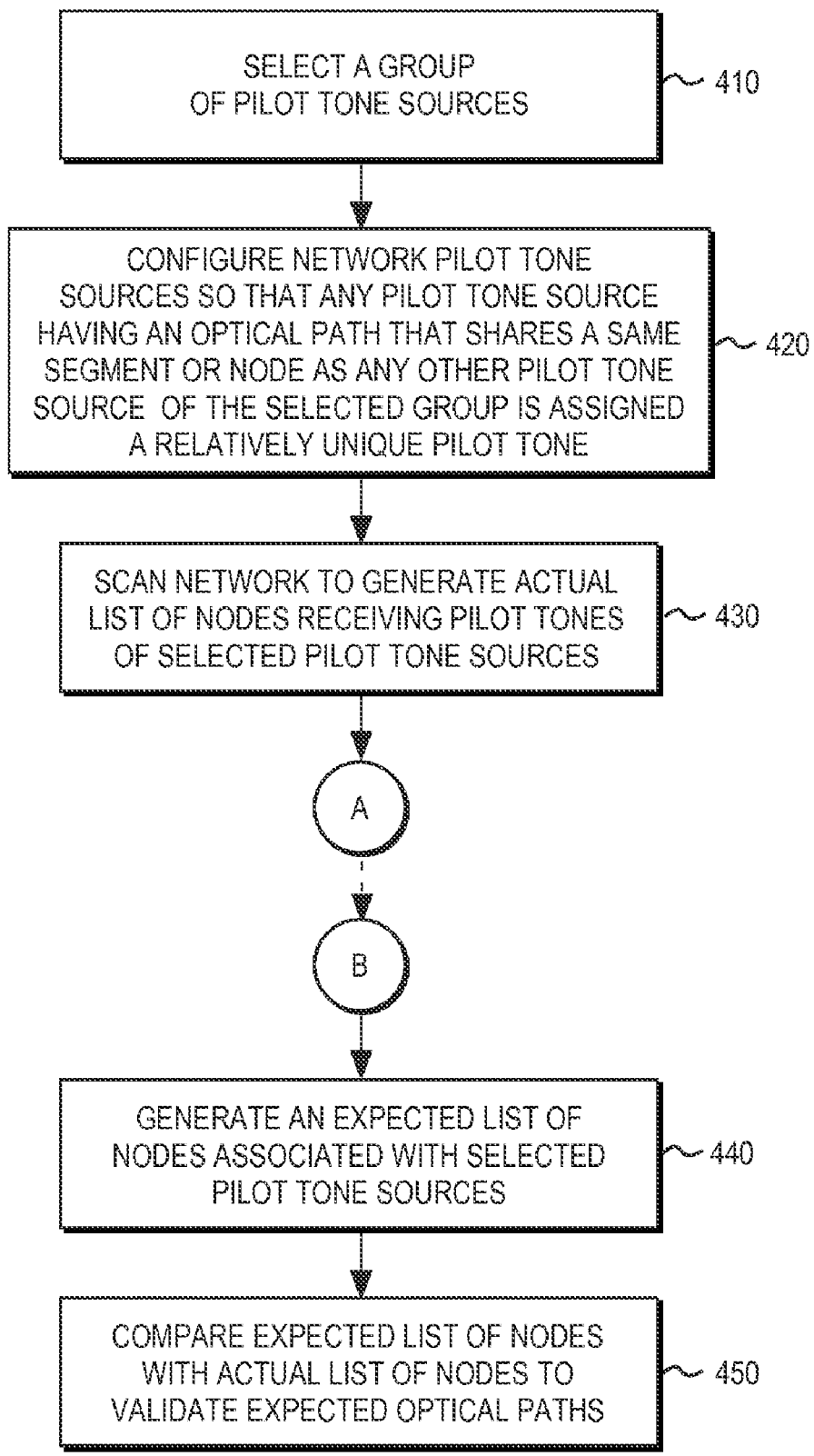
FIG. 4 illustrates a method of validation when pilot tone sources being mapped do not have unique pilot tone values with respect to the remainder of the optical network.

FIG. 4 illustrates the method of validation when mapping pilot tone sources that do not have unique pilot tone values with respect to the remainder of the network. In step 410 a group of pilot tone sources are selected. The group may comprise only a single pilot tone source or a plurality of pilot tone sources. In step 420, each selected pilot tone source of the group is assigned a pilot tone value relatively unique to any other pilot source sharing a same optical segment or node as the selected pilot tone source optical path. In one embodiment, the relatively unique value is also relatively unique to the pilot tones of any other pilot tone source that is not a member of the selected group of pilot tone sources.

An actual list of nodes associated with the group of pilot tone sources is generated in step 430. This can be accomplished, for example, by generating a list of all nodes detecting one or more of the pilot tone values associated with the group of pilot tone sources. In step 440, an expected list of nodes is generated for each pilot tone source in the group. This list can be generated from the network database 172. Validation can be performed by comparing the actual list with the expected list for all members of the pilot tone group in step 450. The presence of extra detected nodes in the actual list indicates errors. If the pilot tones associated with the actual list are uniquely assigned to optical paths, then the error can be associated with the pilot tone source of a particular optical path. If a pilot tone associated with the extra nodes is associated with more than one optical path, there is ambiguity as to which optical path and pilot tone source the error should be associated with.

This technique relies on the expected network configuration being accurate enough to at least identify nodes or segments that are shared between pilot tone sources being mapped so that when unique pilot tone values are not being used for all pilot tone sources being mapped, at least relatively unique pilot tone values can be assigned to pilot tone sources whose optical paths share nodes or segments with optical paths of other pilot tone sources. This approach may be suited for speed when one merely needs to confirm that the nodes listed in an expected optical path for a selected pilot tone source are indeed present in a list of all nodes detecting the same pilot tone value as that of the selected pilot tone source.

The presence of extra nodes in the expected list immediately indicates some type of error with the pilot tone associated with that list. The presence of extra nodes in the actual list may be ambiguous when one of the pilot tones values being detected is shared by more than one pilot tone source and the extra node does not appear on the expected list for either pilot tone source. In such a case, the extra node cannot be associated with either pilot tone source for error analysis without extraneous information such as geographical location of the nodes. A subsequent mapping using relatively unique pilot tones should be able to identify which optical path and pilot tone source the extra node and therefore the error is associated with.

For example, consider a node indicating an error that is associated with a pilot tone shared by two optical paths. The node can be associated exclusively with one of the optical paths if the node is adjacent to one path but not adjacent to the second path. Thus managing the network to maintain at least a two node "distance" between optical paths such that no adjacent nodes share the same pilot tones can significantly ease subsequent network analysis.

The methods of FIGS. 3-4 can be used to validate the expected network configurations stored in network database 172. Absent other extraneous data, however, these techniques do not accurately identify the actual optical path unless the network database accurately models the network or at least a portion of the optical path being mapped. The order of the nodes along a selected optical path associated with a particular pilot tone source, for example, cannot be determined without extraneous information about the nodes.

Thus the techniques above tend to merely identify the nodes associated with an optical path rather than identifying the path taken through the nodes.

Ambiguities in determining the actual path might be resolved, however, by the application of extraneous information and rules about network configuration. For example, information such as the type of node (or at least the type of card the optical signal is being processed through), relative geographic location of a node with respect to other nodes carrying the selected optical signal, and the direction of the optical signal can be used to resolve ambiguities about the relative order of the nodes along a particular optical path. This process can be repeated with every source node in the network to map the entire network. The actual network as inferred from the extraneous data can then be compared with the network database information to resolve network configuration errors, database errors, or problems in the network.

The network tends to be geographically designed to minimize the total length of the optical path segments needed to reach each node along the optical path. Consider an optical path having nodes A, B, C wherein the distances AB, AC, and BC are such that AB<BC<AC. Any two of these segments can be used to join all three nodes. The relationship of the three possible segment combinations is such that $$AB+BC<AB+AC<BC+AC$$

Thus if path length is an accurate determining factor, the actual optical path is likely to consist of segment A-B and either segment B-C or A-C as opposed to consisting of segments B-C and A-C due to the longer segment lengths required to implement the latter possibility.

Analyzed another way, the possible number of ways that the detected nodes might be ordered along the path is the subset of node permutations wherein each node appears exactly once. Each permutation represents a particular node order and therefore a particular combination of segment lengths.

The number of permutations of n objects taken r at a time is expressed as $$P(n, r) = \frac{n!}{(n-r)!}.$$

The number of segment length combinations is expressed as $$C(n, r) = \frac{n!}{r!(n-r)!}$$

Given that every node must appear exactly once along the path, n=r and the expression reduces to n! for the number of possible permutations.

Segment lengths are measured between each pair of nodes and thus r=2 for the combination (C(n,r)) of segment lengths. If all $$\frac{n!}{2!(n-2)!}$$

segment lengths can be calculated, the total path length can be calculated and paired with each permutation. The permutations can then be sorted by total path length. This sorted list also represents the likelihood of a particular permutation. If relative geographic location is the sole determining factor in network configuration, then the actual node order along the optical path must be that represented by the permutation having the shortest calculated total path length.

Other information may be used to improve the validation of the expected network configuration. Information about the particular devices generating or processing the optical signal may be used in conjunction with the actual list of nodes. Knowledge of optical signal direction, and whether the device is a transponder, multiplexer, de-multiplexer, or amplifier can be used to infer node sequence along the path or to eliminate impossible or unlikely node sequences from the list of permutations.

If the source or destination nodes are not known they may be inferred by eliminating any node that is a multiplexer, de-multiplexer, or amplifier and then using directional information to determine which of the remaining nodes is the source or destination node. A transponder node is either a source or a sink and thus permutations with the transponder node in any position other than an end of an optical path can be eliminated.

Knowledge of the location of even a few nodes can significantly reduce the number of permutations to consider for the complete optical path. In particular, the number of permutations to consider is reduced at least to (n–x)! where x represents the number of nodes whose position within the optical path are known. For 5 nodes, lack of such knowledge implies 5! or 120 permutations. If the termination node is known, however, the number of permutations is reduced to 24. Knowing the order of another node such as the pilot tone source further reduces the list to 6 permutations.

In one embodiment, additional steps can be performed before the validation step of FIGS. 3-4 (FIG. 3, step 350; FIG. 4, step 450) to develop a better estimate of the actual optical paths before comparison with the estimated optical paths. In particular, the step of applying network configuration rules to extraneous data associated with each of the nodes in the actual optical path can aid in further defining the actual optical path (e.g., node connectivity order) for comparison. Although some of the extraneous information may be provided by the network database 172, errors may be found by comparing the actual optical path as inferred from the extraneous information with the expected optical path indicated by the network database 172. The additional steps tend to produce an actual list of nodes including connectivity order that enable inferring what the actual map must be either through direct derivation or inferences based on the extraneous information.

When performing the method of FIG. 4, the proper assignment of non-unique pilot tones to pilot tone sources being simultaneous mapped depends upon knowledge from the network database. For example, the network database is used to determine whether pilot tone sources must be assigned other pilot tone values due to shared nodes or segments. Thus the mapping tends to be more of an empirical validation of the network database. The mapping of the optical network relies heavily on the expected network indicated by the network database. The use of truly unique pilot tones, however, in conjunction with other extraneous information can be used to map the optical network substantially independently of the expected network indicated by the network database.

Figure 5:
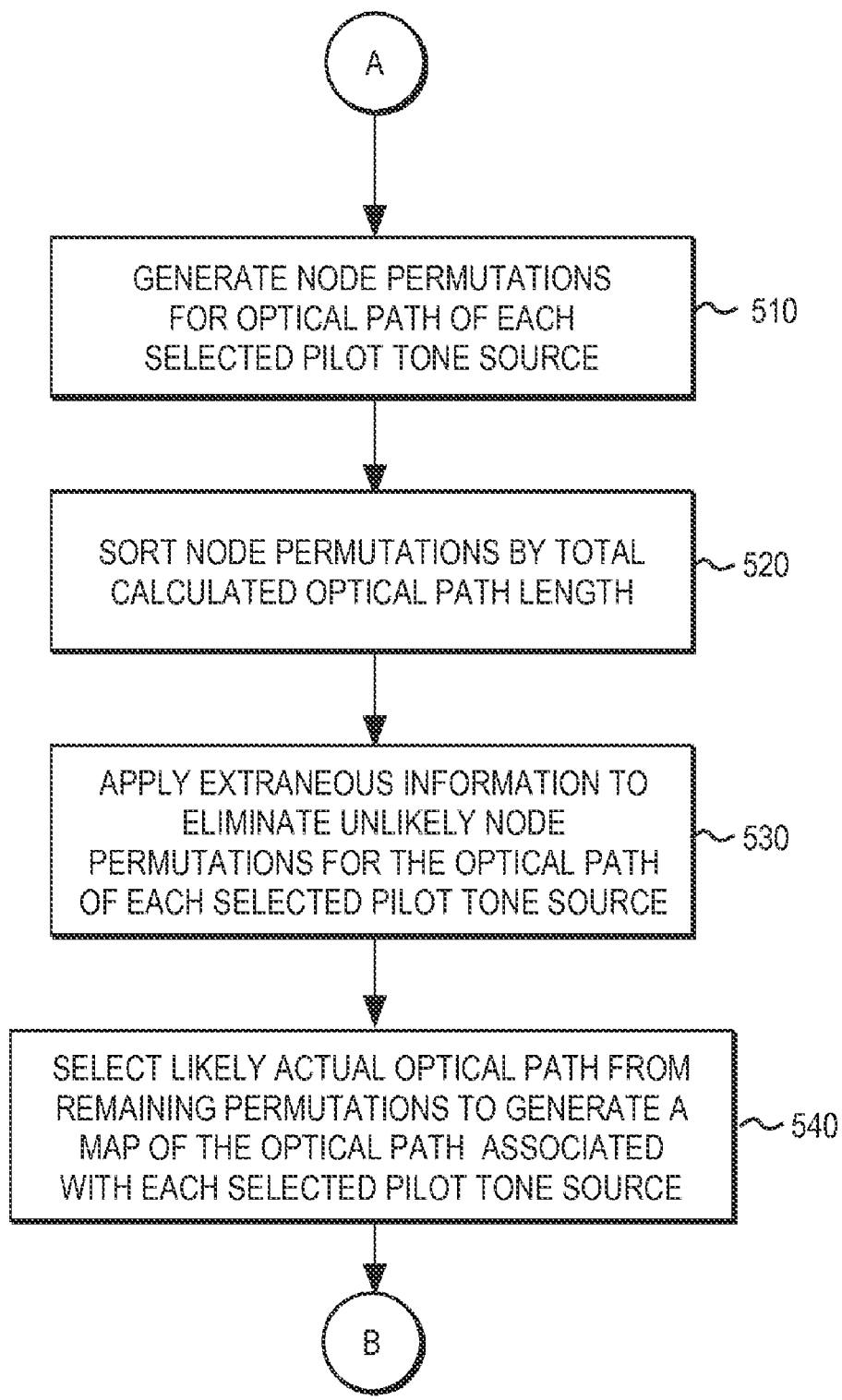
FIG. 5 illustrates additional steps to enable inferring the actual optical paths for mapping the network substantially independently of the optical paths indicated by the network database.

FIG. 5 illustrates additional steps that can be performed before validation steps 350 or 450 to map the network substantially independently of the optical paths indicated by the network database. Generally, geographic construction and other rules are applied to the actual list of nodes to generate an inferred node order for each selected optical path. For validation, the actual list and the inferred node order associated with the optical path of a selected pilot tone source are compared with the expected node list and inferred node order to identify errors. For mere mapping, the step of validation is eliminated.

Beginning with step 510, optical path permutations are generated for the actual node list for the optical path of each selected pilot tone source. The permutations are sorted in step 520 in accordance with the calculated lengths of the optical paths. In step 530, other extraneous information is applied to eliminate permutations. The extraneous information may consist of information from the individual nodes, the network database 172, or both. For example, the extraneous information might be that the network has been configured to always minimize total path length such that all permutations exceeding a minimum calculated path length from the list of permutations may be eliminated. The extraneous information may include node (or card) type such as whether the node is providing amplification, multiplexing, or de-multiplexing of the optical signal. The extraneous information may also include directional information for the optical signal. In step 540, a map of the optical path associated with a selected pilot tone source is generated by selecting a likely optical path from the remaining permutations.

Although the techniques presented above have been used in conjunction with static network configurations, they may be readily applied when network configurations change in order to locate network errors (problematic or faulty component in network), configuration errors (wrong physical configuration for network), or modeling errors (i.e., network database errors).

Physically modifying the network through the elimination, addition, or re-configuration of nodes presents the highest risk of network errors as compared with ongoing maintenance of the network. The use of programmable pilot tones, however, enables configuration validation during and after the addition of network nodes or paths.

The addition of a network node is effectively the addition of a point of pilot tone detection and a finite number of branches from the new node to existing network nodes. In order to ensure relative uniqueness of pilot tones for mappability, the pilot tone sources of the existing network are re-configured to ensure that no branch being added to a node is carrying a same pilot tone signal as already exists in that node.

Figure 6:
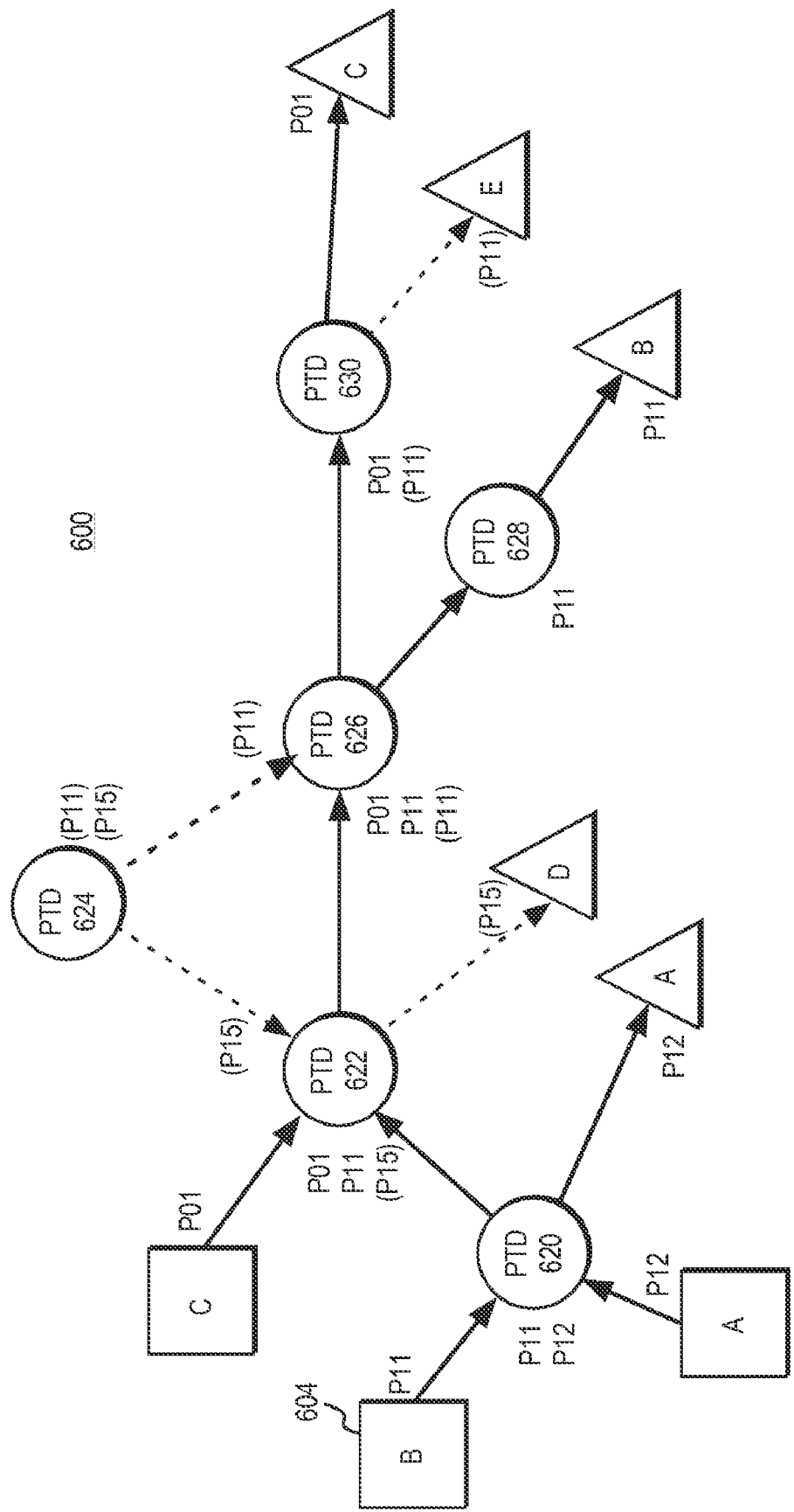
FIG. 6 illustrates an optical communications network being adapted to incorporate an additional node.

FIG. 6 illustrates an optical communications network 600 including PTD nodes 620, 622, 626, 628, and 630. The dotted lines indicate intended additions to the network. In particular, PTD node 624 is to be added to the network by a branch segment coupled to PTD 626 and a branch segment coupled to PTD 622. PTD 624 is presently detecting pilot tones P11 and P15 as indicated by the parenthetical pilot tone values adjacent the node. The parenthetical pilot tone values throughout the remainder of the network indicate the location and value of pilot tones contributed to the network if PTD node 624 is added.

Pilot tone value P11 is already present at node PTD 626. P11 is currently assigned to pilot tone source 604 of the pre-existing network. In order to better isolate errors during re-configuration of the network to add PTD node 624, all optical paths sharing a same node or segment with the optical paths contributed by PTD 624 must be uniquely identified. Nodes 624 and 626, however, are both using P11. The network pilot tone source must be re-configured to ensure that optical paths through PTD 626 or PTD 622 use pilot tone values unique relative to those of PTD 624. In one embodiment, any pilot tone source using a pilot tone value of P11 that has an optical path incorporating node PTD 626 is re-configured to assign a new pilot tone value distinct from those in use by PTD 624.

Figure 7:
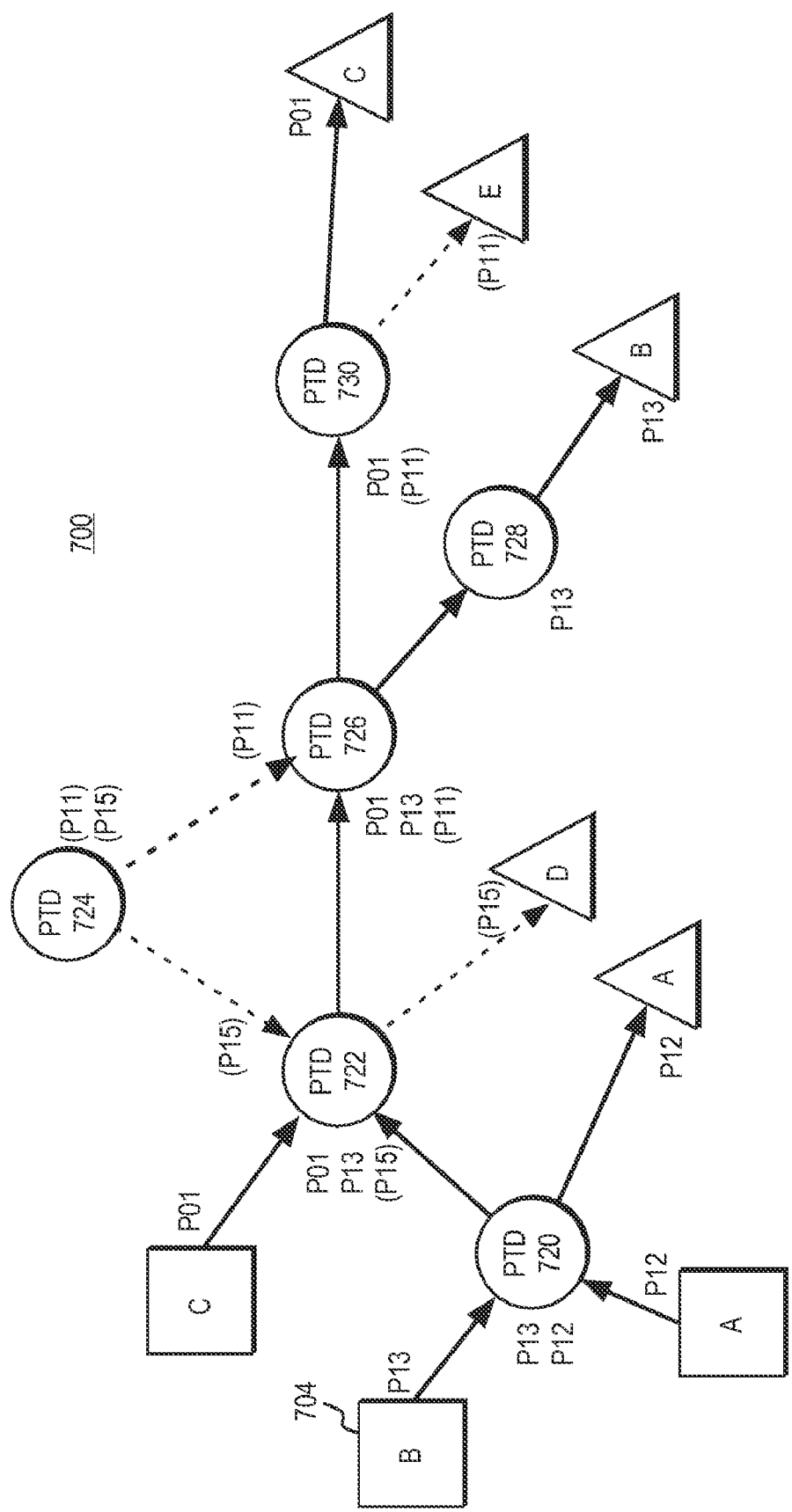
FIG. 7 illustrates a method of configuring network pilot tone sources when adding a node to the optical network.

FIG. 7 illustrates optical communication network 700 and the re-assignment of pilot tone values for pilot tone source 704. Pilot tone source 704 now propagates P13 instead of P11 through PTDs 720, 722, 726, and 728 to pilot tone destination node 752.

Figure 8:
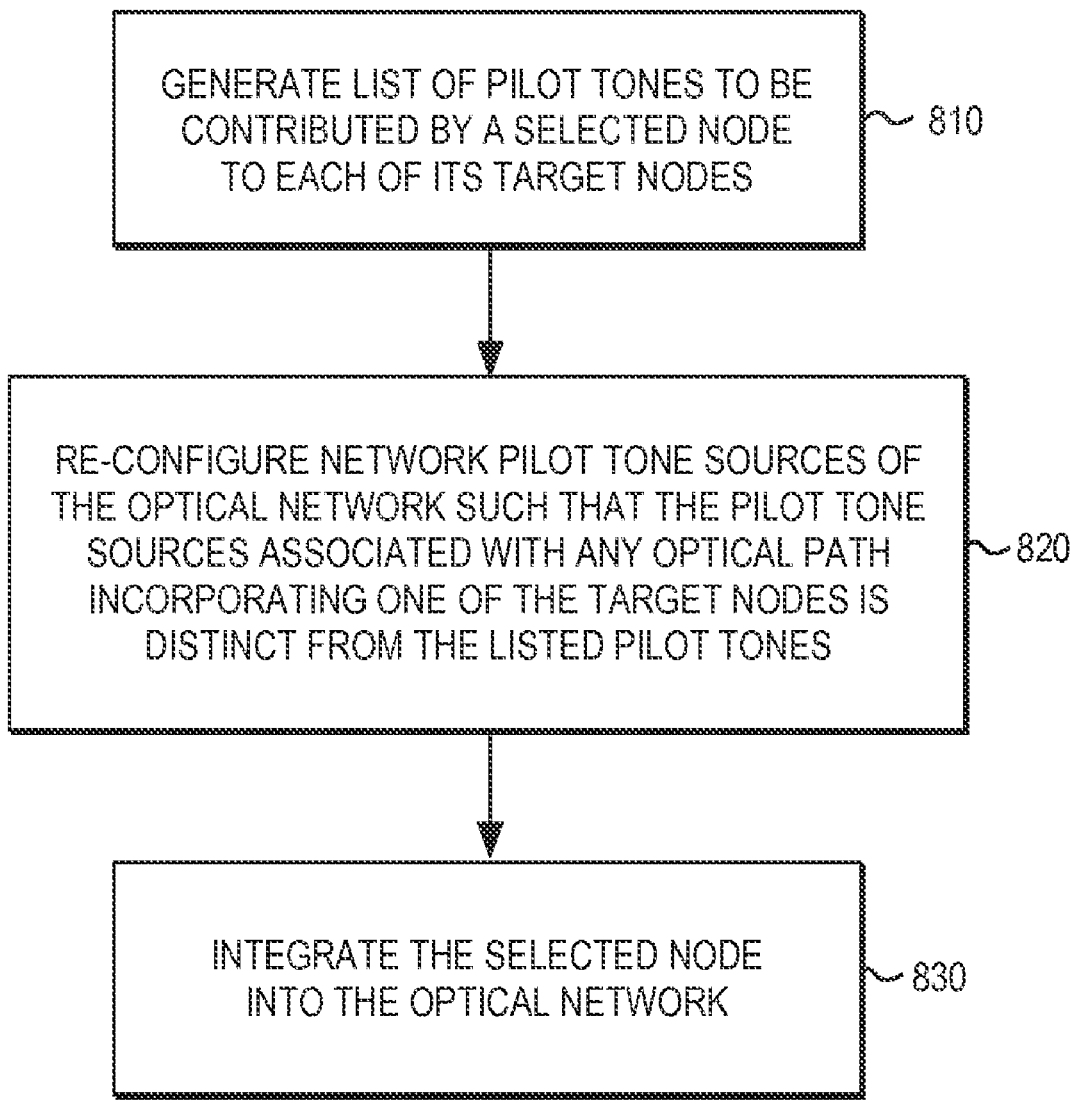
FIG. 8 illustrates a method of re-configuring pilot tone values when adding a node to the optical network.

FIG. 8 illustrates the general process of configuring pilot tone sources when nodes are added to the network. Generally a node is added by attaching it to a target node in the existing network with an optical path segment or branch. The node being added can be attached to more than one node by branches.

For each selected node being added to the network, a list of pilot tones to be contributed by the selected node to each of its target nodes is identified in step 810. In step 820, the network pilot tone sources are re-configured such that for each selected node, the pilot tone sources of any optical path incorporating one of its target nodes has a value distinct from any of its listed pilot tones.

This ensures that any adjacent node having the same pilot tone must be part of the same optical path. In one embodiment this is accomplished by changing the pilot tone values in the existing network. In particular, the pilot tone sources of each optical path sharing any one of the target nodes is re-configured to have a pilot tone value relatively unique to all other pilot tone sources anticipated to be sharing any of the target nodes. In step 830, the selected node can then be integrated (e.g., added) into the optical network. In an alternative embodiment, the pilot tones of the node being added (and thus its associated pilot tone sources) would be changed to achieve the uniqueness of pilot tone values.

Figure 9:
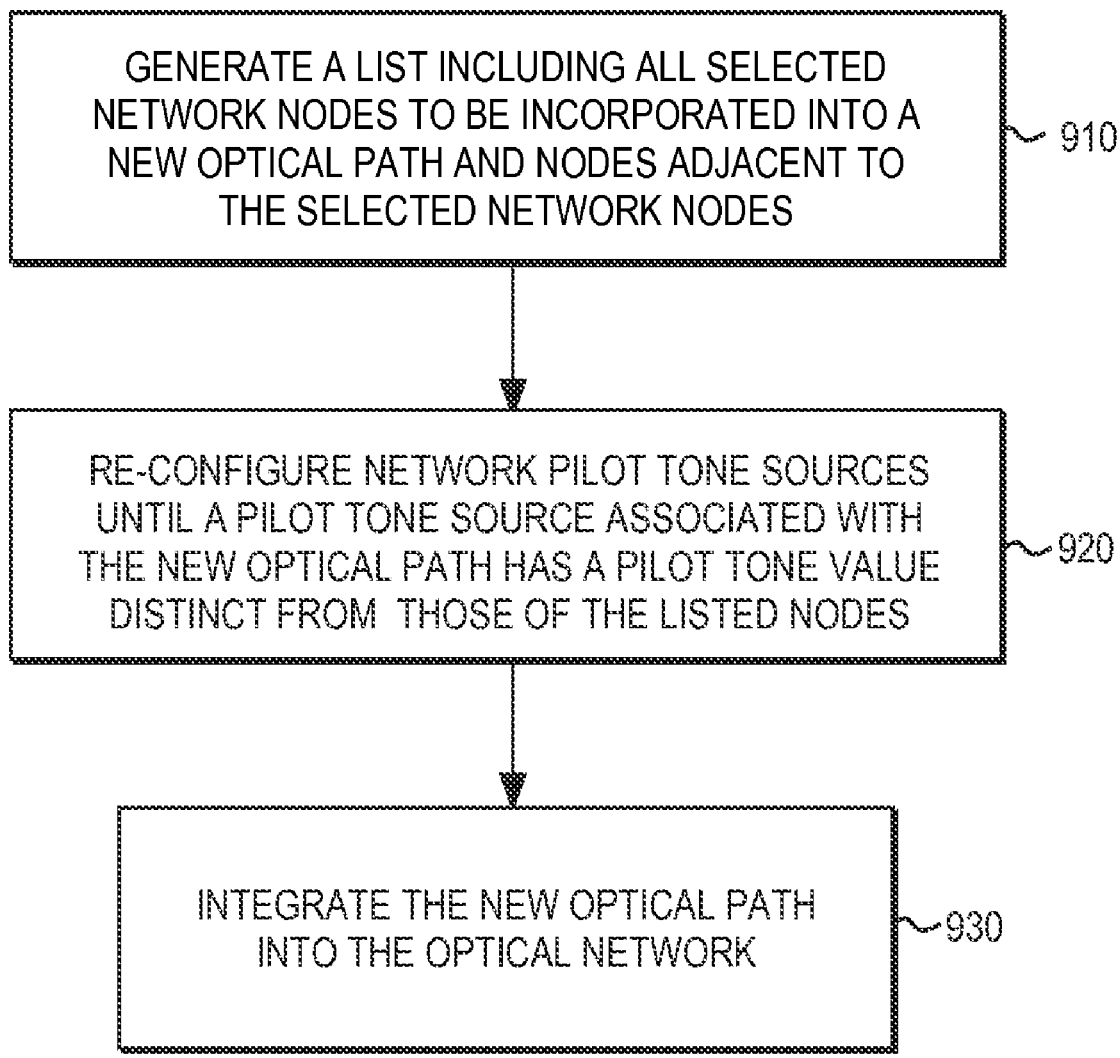
FIG. 9 illustrates a method of re-configuring pilot tone values when adding an optical path to the optical network.

FIG. 9 illustrates a method of re-configuring pilot tone values for the addition of an optical path to a network. The addition of an optical path is essentially the addition of a node-to-node traverse to nodes already existing in the optical network. A pilot tone for the new optical signal that is not present on the union of the list of nodes forming the new optical path or nodes adjacent to such nodes must be found. If no pilot tone is available for the new optical signal, the pilot tone sources providing the detected pilot tone values must be re-programmed to make one available. When the new optical signal has a pilot tone that is not present at any of the nodes it traverses nor at any node adjacent to those it traverses, then the new optical signal can be added to the network in a manner that supports mappability as set forth in FIGS. 3-4.

In step 910, a list of all selected network nodes being incorporated into the new optical path and the nodes adjacent to the selected nodes is generated. In step 920, the network pilot tone sources are re-configured until a pilot tone source associated with the new optical path has a pilot tone distinct from those of any listed node. The new optical path may then be integrated (e.g., added) into the optical network in step 930.

Figure 10:
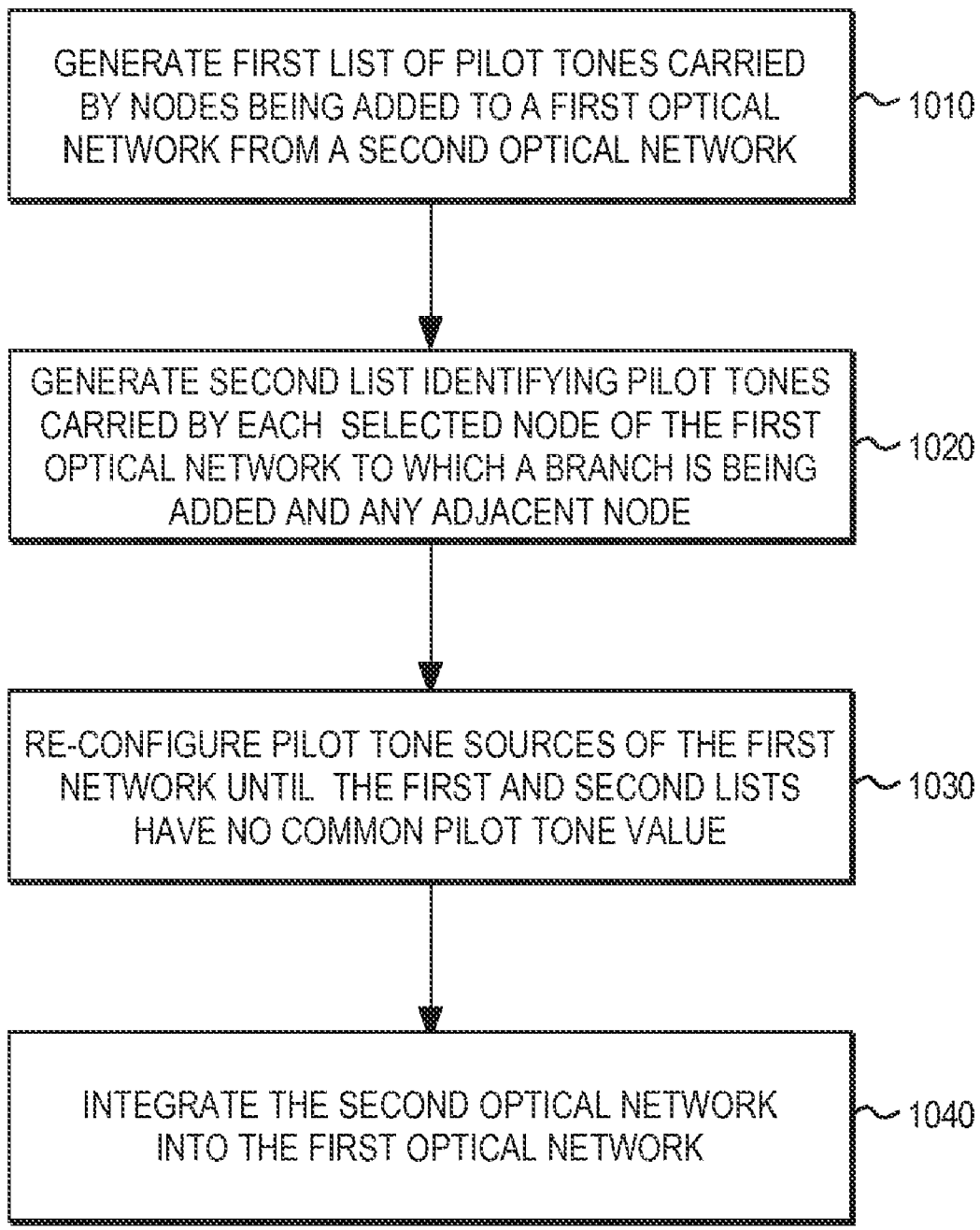
FIG. 10 illustrates a method of re-configuring pilot tone values when joining two optical networks.

FIG. 10 illustrates a method of re-configuring pilot tone values when joining two networks. A first list of pilot tones carried by nodes of a second optical network being added by branches to a first optical network is identified in step 1010.

A second list of pilot tones carried by each selected network node of the first optical network including nodes to which a branch is being added and any adjacent node is identified in step 1020.

In step 1030, the pilot tone sources of the first network are re-configured until all pilot tone sources having an optical path sharing one of the selected network nodes have pilot tones that are relatively unique to each other and to the pilot tones carried by the branches being added to the present network. Moreover, these re-configured pilot tones must be relatively unique compared to the pilot tones present at nodes adjacent to the selected network nodes. Thus the first and second lists should not have any pilot tone values in common. One way to achieve this with certainty is to assign relatively unique pilot tone values to each pilot tone source of the present network where the assigned pilot tone values are also relatively unique as compared with all the pilot tone values of the network being added such that no two pilot tone sources share a same pilot tone value after merging the networks.

In step 1040, the second optical network is merged with the first optical network by providing the intended branches between the nodes of the first and second optical networks as intended. Performance of these steps enables mapping and validation of the network merging process to better resolve possible errors in actual or expected network configurations as well as diagnosing problems other than configuration errors such as component failures.

Thus methods and apparatus to enable mapping and validation of static and dynamic optical networks are described. The use of programmable pilot tone sources enables empirical validation of expected optical network configurations. Although the actual optical network may not be discernable exclusively from pilot tone information, the use of pilot tones in conjunction with extraneous information enables derivation of an actual optical network configuration to a degree of certainty. The derived actual optical network configuration can be compared to the expected optical network to locate actual or expected configuration errors or to perform diagnostics on the optical network. The comparison of actual and expected network configurations can provide various degrees of certainty about the network configuration depending upon how closely related the extraneous information is to the expected configuration.

Referring to FIG. 1, the methods can be implemented using processor 174 and program code or instructions designed to cause the processor to perform the various steps. The program code or processor executable instructions may be stored in memory 176. With respect to step 210 of FIG. 2, either the processor or a user may select the optical path from the network database 172 for analysis. The processor executable instructions instruct the processor to generate the detected list of pilot tones associated with each node. The processor executable instructions then instruct the processor to generate an expected list of pilot tones associated with each node. In one embodiment, this is accomplished through instructions that cause the processor to perform a query of the network database. The processor is then instructed to identify mismatched nodes when the expected and detected lists do not match. Similarly, program code stored in memory 176 can be used to instruct the processor to perform any or all of the methods set forth in FIGS. 1-10.

The program code stored in memory 176 may be distributed using a computer readable storage medium. The computer readable storage medium stores processor executable instructions for managing an optical network, wherein upon execution, the processor executable instructions may instruct the processor to perform any one or all of the methods of FIGS. 1-10. In one embodiment, the storage medium is nonvolatile. Examples of such nonvolatile mediums include floppy disks, compact discs, magnetic tape, semiconductor memories such as flash electrically re-writable memory, etc. In an alternative embodiment, memory 176 is a volatile memory.

In an alternative embodiment, the program code stored in memory 176 may be downloaded from a code repository residing in another location. Physical mechanisms for accomplishing this might include parallel or serial links using protocols such as TCP/IP (Transport Control Protocol/Internet Protocol) in an Ethernet network.

In the preceding detailed description, the invention is described with reference to specific exemplary embodiments thereof. Various modifications and changes may be made thereto without departing from the broader scope of the invention as set forth in the claims. The specification and drawings are, accordingly, to be regarded in an illustrative rather than a restrictive sense.

What is claimed is:

1. A method of managing an optical network comprising:
  a) selecting an optical path having a plurality of nodes from a database defining an expected optical network;
  b) generating a detected list of pilot tones associated with each node of the selected optical path;
  c) generating an expected list of pilot tones associated with each node of the selected optical path; and
  d) comparing the detected and expected lists to identify any mismatched nodes.

2. The method of claim 1 wherein the plurality of nodes includes at least one pilot tone origination node.

3. The method of claim 1 wherein the plurality of nodes includes at least one pilot tone detection node.

4. The method of claim 1 wherein the plurality of nodes includes at least one pilot tone termination node.

5. A method of managing an optical network comprising:
  a) scanning an optical network to generate a detected list of nodes carrying a selected pilot tone value; and
  b) inferring a node connectivity order to map an optical path associated with a first pilot tone source having the selected pilot tone value.

6. The method of claim 5 wherein b) comprises:
  i) generating optical path permutations for the detected list of nodes;
  ii) applying extraneous information to eliminate permutations; and
  iii) selecting a likely optical path for the first pilot tone source from the remaining permutations.

7. The method of claim 5 wherein the extraneous information includes at least one of: a node type, directional information, and network configuration rules.

8. The method of claim 5 wherein any other pilot tone source is set to have a pilot tone value other than the selected pilot tone value.

9. The method of claim 5 wherein the optical network comprises a plurality of other pilot tone sources, wherein the plurality of other pilot tone sources is set to have the same pilot tone value distinct from the selected pilot tone value.

10. The method of claim 5 further comprising:
  c) setting the pilot tone source to have the selected pilot tone value; and
  d) setting all other pilot tone sources to an associated pilot tone value other than the selected pilot tone value.

11. The method of claim 5 further comprising:
c) retrieving at least a portion of the extraneous information from a network database describing an expected map of the optical network.

12. An apparatus comprising:
a database defining an expected optical network having a plurality of nodes, wherein the database enables identification of pilot tones associated with each node of any optical path of the expected optical network; and
a processor coupled to an actual optical network having a plurality of nodes, wherein the processor generates a detected list of pilot tones associated with each node of a selected optical path, wherein the processor generates an expected list of nodes for the selected optical path from the database, wherein the processor compares the detected list with the expected list to identify mismatched nodes.

13. The apparatus of claim 12 wherein the plurality of nodes includes at least one pilot tone origination node.

14. The apparatus of claim 12 wherein the plurality of nodes includes at least one pilot tone detection node.

15. The apparatus of claim 12 wherein the plurality of nodes includes at least one pilot tone termination node.

16. A computer readable storage medium apparatus storing processor executable instructions for managing an optical network, wherein upon execution, the processor executable instructions instruct the processor to perform the following:
a) select an optical path having a plurality of nodes from a database defining an expected optical network;
b) generate a detected list of pilot tones associated with each node of the selected optical path;
c) generate an expected list of pilot tones associated with each node of the selected optical path; and
d) compare the detected and expected lists to identify any mismatched nodes.

17. The apparatus of claim 16 wherein the plurality of nodes includes at least one pilot tone origination node.

18. The apparatus of claim 16 wherein the plurality of nodes includes at least one pilot tone detection node.

19. The apparatus of claim 16 wherein the plurality of nodes includes at least one pilot tone termination node.

* * * * *